United States Patent
Ulrich et al.

(10) Patent No.: US 11,125,858 B2
(45) Date of Patent: Sep. 21, 2021

(54) METHOD FOR INITIAL CALIBRATION OF A SENSOR FOR A DRIVER ASSISTANCE SYSTEM OF A VEHICLE

(71) Applicant: Robert Bosch GmbH, Stuttgart (DE)

(72) Inventors: Alexander Carsten Ulrich, Tamm (DE); Stephan Dorenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 16/444,705

(22) Filed: Jun. 18, 2019

(65) Prior Publication Data

US 2019/0391232 A1 Dec. 26, 2019

(30) Foreign Application Priority Data

Jun. 21, 2018 (DE) .......................... 102018210079.9

(51) Int. Cl.
| | |
|---|---|
| *G01S 7/40* | (2006.01) |
| *G05D 1/02* | (2020.01) |
| *B60W 50/00* | (2006.01) |
| *H04N 17/00* | (2006.01) |
| *G01S 7/497* | (2006.01) |

(52) U.S. Cl.
CPC ............... *G01S 7/40* (2013.01); *B60W 50/00* (2013.01); *G01S 7/497* (2013.01); *G05D 1/0212* (2013.01); *B60W 2050/0083* (2013.01); *B60W 2420/42* (2013.01); *B60W 2420/52* (2013.01); *G05D 2201/0213* (2013.01); *H04N 17/002* (2013.01)

(58) Field of Classification Search
USPC ......................................................... 701/33.1
See application file for complete search history.

(56) References Cited

U.S. PATENT DOCUMENTS

| | | | |
|---|---|---|---|
| 2009/0033926 A1* | 2/2009 | Haug ..................... G06T 7/80 |
| | | | 356/243.1 |
| 2014/0233023 A1* | 8/2014 | Soininen ............... G01S 13/867 |
| | | | 356/138 |
| 2015/0192657 A1* | 7/2015 | Engel ..................... G01S 19/48 |
| | | | 342/357.31 |
| 2018/0024228 A1* | 1/2018 | Schiffmann ............. G01S 13/86 |
| | | | 342/174 |
| 2018/0126936 A1* | 5/2018 | Nell ........................ B60T 8/58 |
| 2018/0188031 A1* | 7/2018 | Samper ................. B60W 10/20 |
| 2018/0365859 A1* | 12/2018 | Oba ......................... B60R 1/00 |
| 2019/0391232 A1* | 12/2019 | Ulrich .................... G01S 7/4972 |

* cited by examiner

*Primary Examiner* — Tyler D Paige

(74) *Attorney, Agent, or Firm* — Norton Rose Fulbright US LLP; Gerard A. Messina

(57) ABSTRACT

A method for initial calibration of a sensor for a driver assistance system of a vehicle, comprising the steps of: detecting a trajectory of the vehicle by way of a reference device disposed externally to the vehicle; ascertaining a sensor axis of the sensor; ascertaining a travel axis of the vehicle from the detected trajectory; and ascertaining an angle between the sensor axis and the travel axis.

7 Claims, 1 Drawing Sheet

Figure 1:
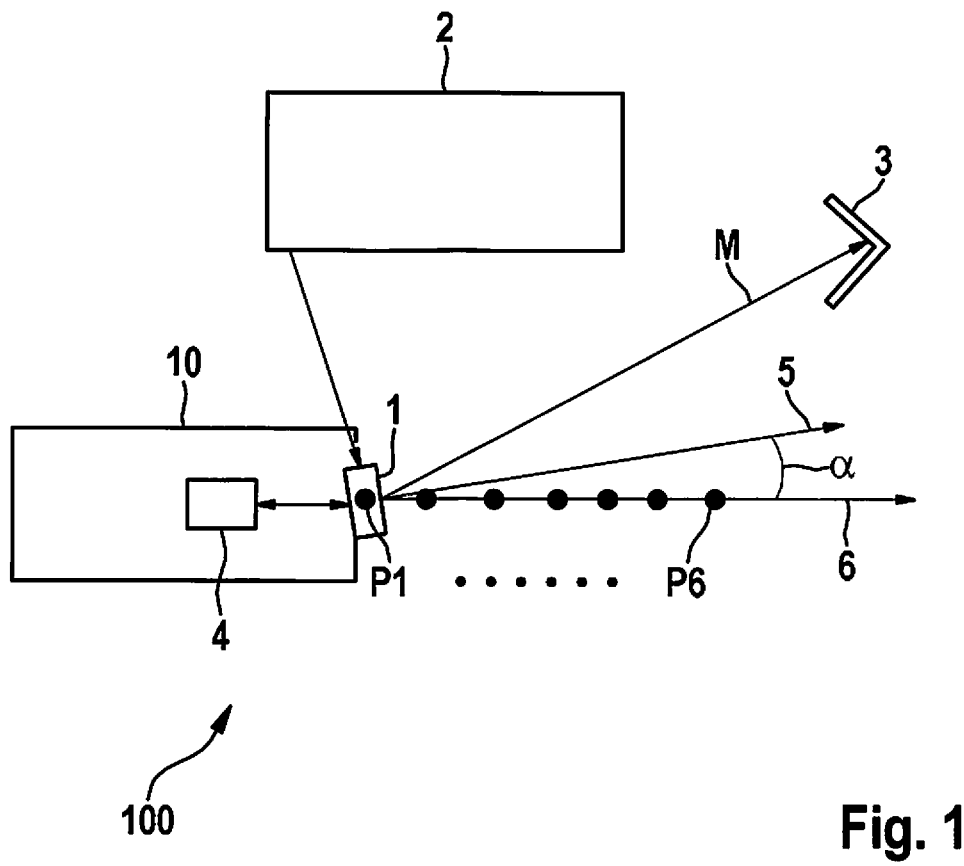

METHOD FOR INITIAL CALIBRATION OF A SENSOR FOR A DRIVER ASSISTANCE SYSTEM OF A VEHICLE

FIELD OF THE INVENTION

The present invention relates to a method for initial calibration of a sensor for a driver assistance system of a vehicle. The present invention further relates to a system for initial calibration of a sensor for a driver assistance system of a vehicle. The present invention further relates to a computer program product.

BACKGROUND INFORMATION

In order for the driver assistance functions of a sensor to be available upon leaving the factory, a sensor must firstly be calibrated. At present, this calibration is often carried out on a chassis stand having an improved axis toward a suitable target. This measurement of the travel axis, and calibration on the test stand, nevertheless requires valuable time.

SUMMARY

An object of the present invention is therefore to furnish a method for improved calibration of a sensor for a driver assistance system.

In accordance with a first aspect, the object is achieved with a method for initial calibration of a sensor, having the steps of:
  detecting a trajectory of the vehicle by way of a reference device disposed externally to the vehicle;
  ascertaining a sensor axis of the sensor;
  ascertaining a travel axis of the vehicle from the detected trajectory; and
  ascertaining an angle between the sensor axis and the travel axis.

An angle between the travel axis and sensor axis (alignment angle or misalignment angle of the sensor) can thereby be ascertained by way of a very short driving distance. Technically complex and inaccurate multilateration is thus not necessary. Advantageously, after the method is carried out one or several driver assistance systems are available and ready for use by way of an initially calibrated sensor.

In accordance with a second aspect, the object is achieved with a system for initial calibration of a sensor for a driver assistance system, having:
  a reference device, disposed externally to the vehicle, for detecting a trajectory of the vehicle, a travel axis of the vehicle being ascertainable from the detected trajectory;
  an ascertaining device for ascertaining a sensor axis of the sensor; and
  a control device of the sensor, which device is embodied to ascertain an angle between the sensor axis and the travel axis.

An advantageous refinement of the method provides that the trajectory is detected by way of positions of the vehicle. As a result, the trajectory can be ascertained using a defined number of detected points of a path of the vehicle.

A further advantageous refinement of the method provides that the sensor axis is ascertained by way of a point target device of known position disposed externally to the vehicle, and a control device of the sensor. The sensor axis of the sensor, which ideally is oriented in a travel direction of the vehicle, can thereby be accurately ascertained. Accurate detection of the sensor axis is possible thanks to the accurately known position of the point target device.

A further advantageous refinement of the method is notable for the fact that data of the travel axis are conveyed wirelessly from the reference device to the control device of the sensor. This makes possible highly up-to-date and rapid transfer of the data to the control device, with the result that the travel axis can be ascertained quickly and accurately by way of the control device.

A further advantageous refinement of the method is notable for the fact that wireless conveyance of the data is carried out via WLAN. Advantageously, a rapid and efficient conveyance method is thereby furnished which is advantageously usable, for example, in a production area. WLAN is present nowadays as a standard feature in most vehicles, so that data packets can rapidly and efficiently be flashed into the control device in this manner.

A further advantageous refinement of the method is notable for the fact that the angle is ascertained by way of the control device. An electronic control device can thereby be used to ascertain the alignment angle.

A further advantageous refinement of the method is notable for the fact that the method is carried out for at least one among: a video sensor, a radar sensor, a lidar sensor. Versatile usability of the method is thereby advantageously conceivable, different point target devices being provided for each of the aforesaid sensor devices.

The invention will be described in detail below, with further features and advantages, with reference to two Figures. All features described or depicted in that context, individually or in any combination, constitute the subject matter of the invention, irrespective of their grouping in the claims or their internal references and irrespective of their respective presentation and depiction in the description and the Figures.

BACKGROUND INFORMATION

FIG. 1 schematically depicts a system for initial calibration of a sensor for a driver assistance system of a vehicle.

Figure 2:
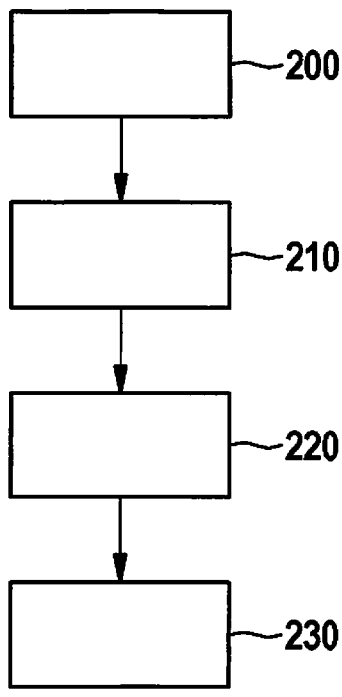

FIG. 2 schematically shows a sequence for execution of an embodiment of the proposed method.

DETAILED DESCRIPTION

FIG. 1 schematically depicts a system 100 for initial calibration of a sensor 1 for a driver assistance system. A vehicle 10 is shown, having a sensor 1 e.g. in the form of a video sensor, radar sensor, lidar sensor, etc. Sensor 1 transmits a measurement beam M to a point target device 3 of known position, disposed externally to vehicle 10. Point target device 3 has several surfaces that are disposed at 90° to one another and are reflective for a radar sensor (e.g. are metallic), with the result that measurement beam M is reflected back to sensor 1 as a result of multiple reflection.

Technically different configurations of point target device 3 for other types of sensor 1 are conceivable. Point target device 3 thus implements the functionality of a point target or corner reflector. The result is that by way of point target device 3, a sensor axis 5 which is disposed orthogonally to vehicle sensor 1 and which, when correctly aligned, has the same alignment as a travel axis 6 of vehicle 10, is ascertained.

Also shown is a reference device 2, for example in the form of a laser tracker, which carries out a highly accurate detection of a vehicle motion or a path (trajectory) of vehicle

10. For that purpose, reference device 2 detects individual positions P1, ..., P6 of vehicle 10 or also an entire trajectory of vehicle 10.

Exact localization of point target device 3 and of reference device 2 needs to be carried out only once in a reference coordinate system, for example in an orthogonal coordinate system of a production area (not depicted). The result is that the position of point target device 3 in relation to reference device 4 [sic: 2] is known to reference device 2. Advantageously, execution of the proposed method does not require utilization or knowledge of GNSS coordinates.

The data regarding the trajectory of the vehicle which are detected by reference device 2 are then transferred wirelessly over the air (OTA) to a control device 4, disposed on vehicle 10, of sensor 10 [sic: 1], with the result that electronic control device 4 can computationally ascertain travel axis 6 of vehicle 10. A calculation of alignment angle α, constituting an angle between sensor axis 5 and travel axis 6, is then effected by way of control device 4.

Advantageously, only a short travel distance for vehicle 10 is necessary for the proposed method, advantageously enabling calibration of sensor 1 even in physically confined production areas. For example, a travel distance of only approx. 1 m to approx. 2 m is sufficient.

The method can preferably be carried at the end of the production line, so that vehicle 10 possesses a functional driver assistance system at the end of the line (EOL), since sensor 1 required for that purpose has been initially calibrated.

Advantageously, the method can be carried out using substantially fewer resources as compared with a method using multilateration, which requires approx. 30 m to approx. 50 m.

In practice, execution of the method proceeds, for example, as follows:

Firstly, point target device 3, whose exact position is known to control device 4 of sensor 1, is set up.

Vehicle 10 then drives slowly (e.g. at a speed of approx. 5 km/h to approx. 15 km/h) toward point target device 3, following a path toward point target device 3 which can be straight and/or curved, and ascertains its position. Sensor axis 5 can thereby be ascertained in the manner recited above.

At the same time, reference device 2, for example in the form of a laser tracker, measures the vehicle trajectory of vehicle 10.

Alternatively, reference device 2 can also be embodied as a camera (not depicted) that can recognize marking elements (not depicted) disposed on vehicle 10, it being thereby possible to determine a position and ascertain a trajectory of vehicle 10.

After the aforesaid short drive, the vehicle trajectory can then be transferred OTA (e.g. via WLAN) to control device 4 of sensor 1, in which the data of vehicle axis 6 are aligned or synchronized with the data of sensor axis 5, for instance with the aid of time stamps associated with the data. Various standards, for example WLAN, GSM, UMTS, LTE, 5G, etc. are conceivable for wireless transfer of the data to control device 4.

With a knowledge of the measured value of point target device 3 as a function of the sensor position, and of the measured travel axis 3, it is now possible to calculate alignment angle α very accurately, for example by way of control device 4.

Sensor 1 can thereby be calibrated with very high accuracy and in a very short time; this advantageously reduces costs at the factory and, in normal operation, enhances the robustness of sensor 1.

The result is that a dynamic calibration can thereby be implemented, making the calibration process possible without idle times and alignments of travel axis 6 while driving. For example, a drive from the factory to a parking area or to a transporter can also be used for this purpose.

During normal operation of sensor 1, alignment angle α ascertained using the method is taken into account computationally during operation of the driver assistance system so that advantageously, correct operation of sensor 1 does not require any mechanical modification of the alignment of sensor 1. In functional terms, sensor 1 therefore has, after calibration, an alignment of sensor axis 5 which is identical to travel axis 6.

FIG. 2 schematically shows a sequence for carrying out the proposed method.

In a step 200, a trajectory of vehicle 10 is detected by way of a reference device 2 disposed externally from the vehicle.

In a step 210, a sensor axis of sensor 1 is ascertained.

In a step 220, a travel axis 6 of vehicle 10 is ascertained from the detected trajectory.

In a step 230, an angle α between sensor axis 5 and travel axis 6 is ascertained.

Steps 200 to 220 can be carried out in any order.

Advantageously, the method according to the present invention can be implemented as a software program that executes, for example, on electronic control device 4. It is also conceivable, however, to carry out the method on other electronic devices that are disposed internally or externally to vehicle 10. Simple adaptability of the method is thereby advantageously supported.

One skilled in the art will appropriately modify the features of the invention, and/or combine them with one another, without deviating from the essence of the invention.

What is claimed is:

1. A method for performing an initial calibration of a sensor for a driver assistance system of a vehicle, comprising:
    detecting a trajectory of the vehicle using a laser tracker disposed externally to the vehicle;
    wirelessly receiving the detected trajectory from the laser tracker by an electronic control device of the sensor disposed in the vehicle;
    ascertaining, using the sensor, a sensor axis of the sensor;
    ascertaining, using the electronic control unit, a travel axis of the vehicle from the detected trajectory;
    ascertaining, using the electronic control unit, an alignment angle between the sensor axis and the travel axis; and
    performing the initial calibration of the sensor for the driver assistance system, using the ascertained alignment angle.

2. The method as recited in claim 1, wherein the trajectory is detected by way of positions of the vehicle.

3. The method as recited in claim 1, wherein the sensor axis is ascertained by way of a point target device of known position disposed externally to the vehicle, and the electronic control device of the sensor.

4. The method as recited in claim 1, wherein the wirelessly conveying of the data of the travel axis is carried out via wireless local area network (WLAN).

5. The method as recited in claim 1, wherein the method is carried out for at least one of a video sensor, a radar sensor, and a lidar sensor.

6. A system for performing an initial calibration of a sensor for a driver assistance system of a vehicle, comprising:
- a laser tracker, disposed externally to the vehicle, configured to detect a trajectory of the vehicle;
- an electronic control device of the sensor disposed in the vehicle configured to: (i) wirelessly receive the detected trajectory from the laser tracker, (ii) ascertain a travel axis of the vehicle using the detected trajectory, (iii) ascertain, using the sensor, a sensor axis of the sensor, (iv) ascertain an alignment angle between the sensor axis and the travel axis, and (v) perform the initial calibration of the sensor for the driver assistance system, using the ascertained alignment angle.

7. A non-transitory computer-readable data medium on which is stored program code for performing an initial calibration of a sensor for a driver assistance system of a vehicle, the program code, when executed by an electronic calculation device, causing the electronic calculation device to perform the following steps:
- detecting a trajectory of the vehicle using a laser tracker disposed externally to the vehicle;
- wirelessly receiving the detected trajectory from the laser tracker by an electronic control device of the sensor disposed in the vehicle;
- ascertaining, using the sensor, a sensor axis of the sensor;
- ascertaining, using the electronic control unit, a travel axis of the vehicle from the detected trajectory;
- ascertaining, using the electronic control unit, an alignment angle between the sensor axis and the travel axis;
- performing the initial calibration of the sensor for the driver assistance system, using the ascertained alignment angle.

* * * * *